(12) United States Patent (10) Patent No.: US 9,430,139 B2
Homma et al. (45) Date of Patent: Aug. 30, 2016

(54) INFORMATION PROCESSING APPARATUS, INFORMATION PROCESSING METHOD, AND PROGRAM

(75) Inventors: Fuminori Homma, Tokyo (JP); Tatsushi Nashida, Kanagawa (JP)

(73) Assignee: Sony Corporation, Tokyo (JP)

(*) Notice: Subject to any disclaimer, the term of this patent is extended or adjusted under 35 U.S.C. 154(b) by 786 days.

(21) Appl. No.: 13/246,473

(22) Filed: Sep. 27, 2011

(65) Prior Publication Data

US 2012/0084647 A1    Apr. 5, 2012

(30) Foreign Application Priority Data

Oct. 4, 2010   (JP) ................. P2010-224770

(51) Int. Cl.
  *G06F 17/00* (2006.01)
  *G06F 3/0488* (2013.01)
  *G06F 17/21* (2006.01)
  *G06F 3/0483* (2013.01)

(52) U.S. Cl.
  CPC .......... *G06F 3/04883* (2013.01); *G06F 3/0483* (2013.01); *G06F 17/212* (2013.01); *G06F 2203/04806* (2013.01); *G06F 2203/04808* (2013.01)

(58) Field of Classification Search
  CPC ..................................................... G06F 17/212
  USPC ........................................................ 715/273
  See application file for complete search history.

(56) References Cited

U.S. PATENT DOCUMENTS

| | | | | |
|---|---|---|---|---|
| 5,239,665 | A * | 8/1993 | Tsuchiya | 715/776 |
| 5,663,748 | A * | 9/1997 | Huffman et al. | 345/173 |
| 5,696,982 | A * | 12/1997 | Tanigawa et al. | 715/236 |
| 5,761,485 | A * | 6/1998 | Munyan | 715/839 |
| 5,801,713 | A * | 9/1998 | Endo et al. | 345/473 |
| 6,021,306 | A * | 2/2000 | McTaggart | 434/317 |
| 6,741,268 | B1 * | 5/2004 | Hayakawa | 715/777 |
| 7,912,829 | B1 * | 3/2011 | Mathes et al. | 707/707 |
| 2003/0048305 | A1 * | 3/2003 | Liang et al. | 345/776 |
| 2004/0039750 | A1 * | 2/2004 | Anderson et al. | 707/103 R |
| 2004/0080541 | A1 * | 4/2004 | Saiga et al. | 345/805 |
| 2004/0148574 | A1 * | 7/2004 | Ohtani et al. | 715/525 |
| 2005/0081145 | A1 * | 4/2005 | Schwartzkopf | 715/517 |
| 2005/0198593 | A1 * | 9/2005 | Keely et al. | 715/863 |
| 2008/0201348 | A1 * | 8/2008 | Edmonds et al. | 707/101 |
| 2010/0011281 | A1 * | 1/2010 | Hong et al. | 715/232 |
| 2010/0271645 | A1 * | 10/2010 | Nakabayashi | 358/1.9 |
| 2011/0197121 | A1 * | 8/2011 | Kletter | 715/234 |
| 2011/0261030 | A1 * | 10/2011 | Bullock | 345/204 |

* cited by examiner

*Primary Examiner* — Laurie Ries
(74) *Attorney, Agent, or Firm* — Paratus Law Group, PLLC

(57) ABSTRACT

An apparatus and method provide logic for processing information. In one implementation, an apparatus includes a display unit configured to display content to a user. The display unit includes a display surface, and the content is associated with at least a portion of a first page of an electronic document. A detection unit is configured to detect a first type of user activation associated with a first-type activation position on the display surface. A control unit is configured to determine whether the first-type activation position falls within a predetermined portion of the display screen, which is visually imperceptible to the user. The control unit is further configured to identify a first successive page of the electronic document based on at least the type of user activation, when the activation falls within the pre-determined portion.

20 Claims, 15 Drawing Sheets

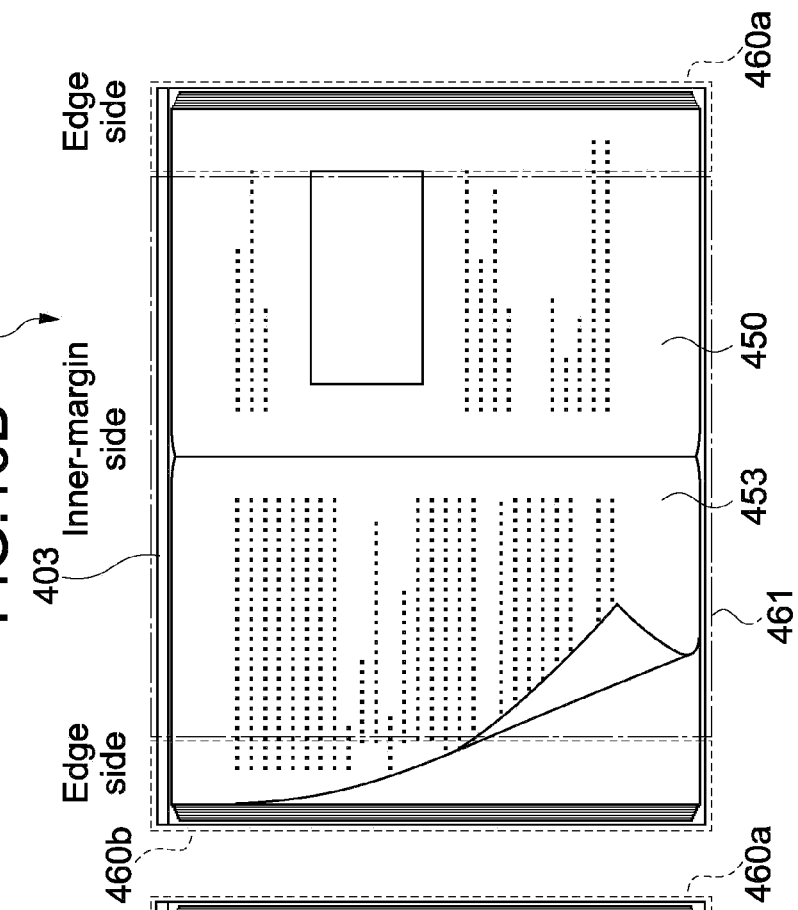
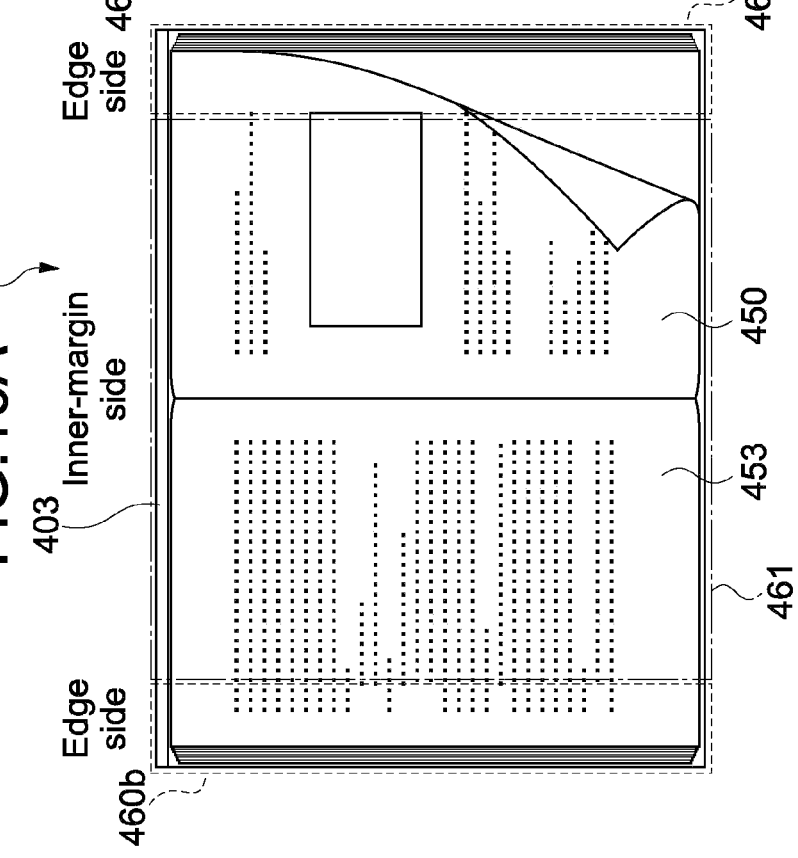

INFORMATION PROCESSING APPARATUS, INFORMATION PROCESSING METHOD, AND PROGRAM

BACKGROUND

The disclosed exemplary embodiments relate to an information processing apparatus, an information processing method, and a computer-readable medium storing a program for displaying a content of an electronic book and the like on a display screen such as a touch panel.

From the past, there is known a terminal apparatus such as an electronic book reader that displays electronic books including characters and figures. Such a terminal apparatus is demanded to enable a user to view electronic books with good operability, and various display methods, GUIs (Graphical User Interfaces), etc. for an electronic book, onto which, for example, an operation carried out when the user views an actual book is reflected, are being developed.

For example, when a real book is viewed, such an operation is frequently performed as to turn pages to search for a target page. As an operation that is based on this operation, there is known a page-scrolling operation to search for a target page from multiple pages of an electronic book.

In a mobile apparatus disclosed in Japanese Patent Application Laid-open No. 2008-234372, a horizontal touch sensor and a vertical touch sensor are provided on an outer edge of a display screen for displaying contents of electronic books. Pages of an electronic book are scrolled by an operation to those touch sensors (see, for example, paragraph [0028] and FIG. 1).

Further, a mobile information terminal disclosed in Japanese Patent Application Laid-open No. 2009-205565 is provided with a flexible display that can be curved and bend sensors capable of detecting a curve amount of the display. When the display is curved by a user, pages of an electronic book are scrolled based on a curve amount detected by the bend sensors (see, for example, paragraph [0041] and FIG. 5).

SUMMARY

However, the page-scrolling operations discussed above are performed using hardware devices, such as a touch sensor, a flexible display, and a bend sensor. Thus, dedicated interfaces are required in many cases, and hence those operations are difficult to perform by versatile operating systems (OSs).

Meanwhile, scroll bars and the like for the page-scrolling operations may be displayed as GUI components.

However, in this case, the GUI components impose a limitation on a region in which contents of an electronic book are displayed. Further, for example, when a small display screen is used, GUI components displayed on the small display screen are difficult to operate.

In view of the circumstances as described above, there is a need for an information processing apparatus, an information processing method, and a program that enable such an operation as to switch a displayed page to a target page to be performed with good operability without using dedicated hardware devices or GUI components for switching pages.

Consistent with an exemplary embodiment, an information processing apparatus includes a display unit configured to display content to a user. The display unit includes a display surface, and the content is associated with at least a portion of a first page of an electronic document. The detection unit is configured to detect a type of user activation, and the type of user activation being associated with an activation position on the display surface. A control unit is configured to determine whether the activation position falls within a predetermined portion of the display screen. The predetermined portion is visually imperceptible to the user. The control unit is further configured to identify a first successive page of the electronic document based on at least the type of user activation, when the activation position falls within the pre-determined portion.

Consistent with an additional exemplary embodiment, a computer-implemented method for processing information includes displaying content on a display surface of a display unit. The content is associated with at least a portion of a page of an electronic document. The method includes detecting a type of user activation. The type of user activation is associated with an activation position on the display surface. The method determines whether the activation position falls within a predetermined portion of the display screen. The predetermined portion is visually imperceptible to the user. A second page of the electronic document is identified based on at least the type of user activation, when the activation position falls within the pre-determined portion.

Consistent with a further exemplary embodiment, a non transitory, computer-readable storage medium stores a program that, when executed by a processor, causes the processor to perform a method for processing information. The method includes displaying content on a display surface of a display unit. The content is associated with at least a portion of a page of an electronic document. The method includes detecting a type of user activation. The type of user activation is associated with an activation position on the display surface. The method determines whether the activation position falls within a predetermined portion of the display screen. The predetermined portion is visually imperceptible to the user. A second page of the electronic document is identified based on at least the type of user activation, when the activation position falls within the pre-determined portion.

Consistent with another exemplary embodiment, an information processing apparatus includes a display unit configured to display a first portion of content to a user. The display unit includes a display surface. A receiving unit is configured to receive a position on the display surface corresponding to a first type of user activation, and a control unit is configured to determine whether the received position falls within a predetermined portion of the display surface. The control unit is further configured to generate a signal to display a second portion of content to the user, when the received position falls within the predetermined portion, and the display unit is further configured to display the second content portion, based on the generated signal.

As described above, according to the disclosed exemplary embodiments, such an operation as to switch a displayed page to a target page can be performed with high operability without using dedicated hardware devices or GUI components for switching pages.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 16 are schematic views of a display screen of a portable terminal according to another exemplary embodiment.

DETAILED DESCRIPTION OF EMBODIMENTS

Hereinafter, exemplary embodiments will be described with reference to the drawings.

1. First Exemplary Embodiment a. Information Processing Apparatus

Figure 1:
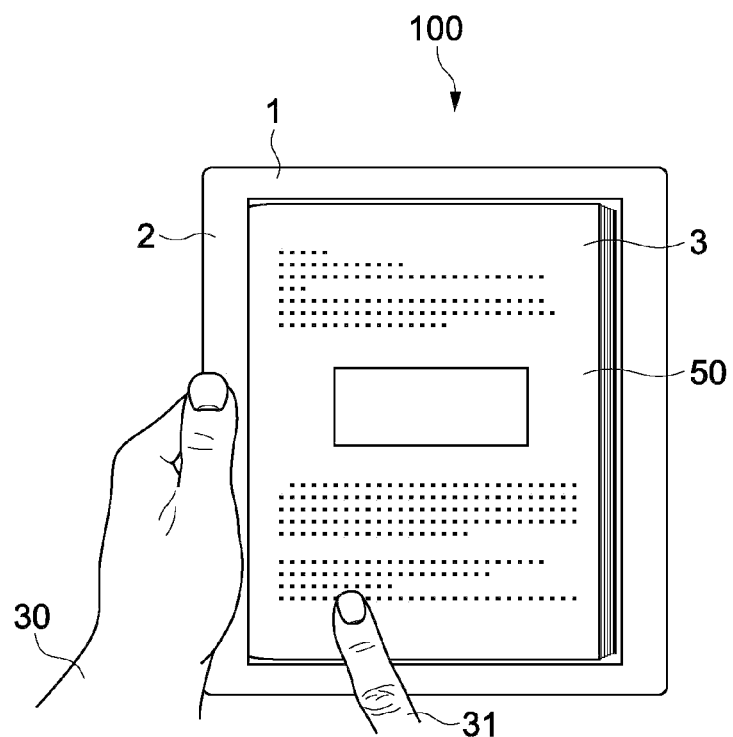
FIG. 1 is a schematic view of an external appearance of a portable terminal as an information processing apparatus according to a first exemplary embodiment.

FIG. 1 is a schematic view of an external appearance of an information processing apparatus according to a first exemplary embodiment. In this exemplary embodiment, a portable terminal 100 provided with a touch panel is used as the information processing apparatus. The portable terminal 100 in this exemplary embodiment enables an electronic document, such as electronic book 50, to be viewed.

As illustrated in FIG. 1, the portable terminal 100 includes a casing 1 to be held by a user 30 and a display screen 3 provided to a front surface 2 of the casing 1. The casing 1 is formed of, for example, metal such as aluminum and stainless steel, or plastic. For example, as illustrated in FIG. 1, that is, when viewed from the user 30, the casing 1 has the following size: a vertical dimension of approximately 25 cm, a lateral dimension of approximately 30 cm, and a thickness of approximately 1 cm. However, the material and the size of the casing 1 are not limited to this example.

The display screen 3 is provided over almost the entire front surface 2 of the casing 1. The electronic book 50 is displayed on the display screen 3 so that contents of the electronic book 50 are browsed.

Figure 2:
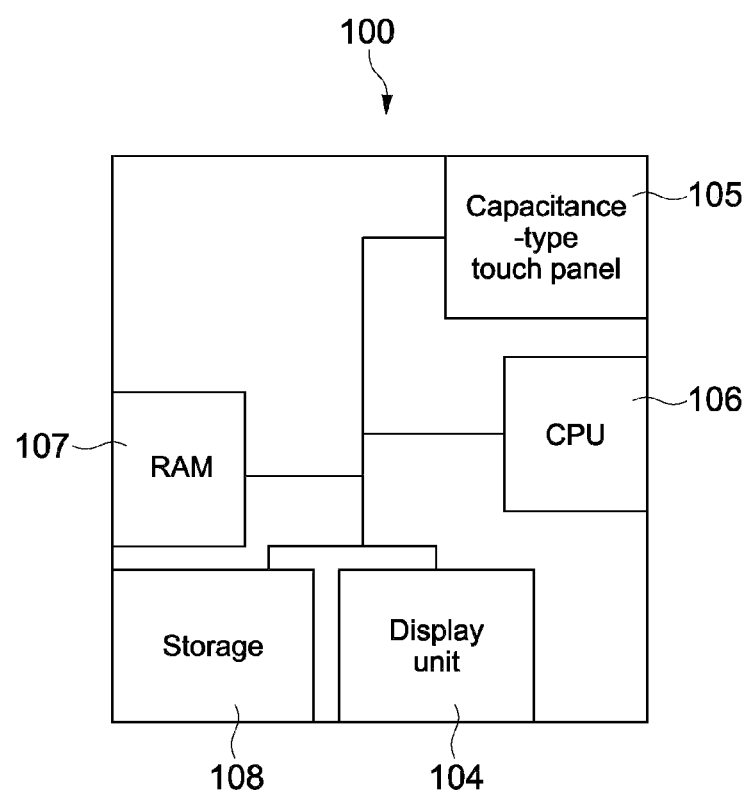
FIG. 2 is a block diagram illustrating a configuration example of the portable terminal illustrated in FIG. 1.

FIG. 2 is a block diagram illustrating a structural example of the portable terminal 100. The portable terminal 100 includes a display unit 104 having the above-mentioned display screen 3, a touch panel 105, a central processing unit (CPU) 106, a random access memory (RAM) 107, and a storage 108. For example, the CPU 106, the RAM 107, and an input-output interface (not shown) are connected to each other via a bus and the like. In addition, the display unit 104, the touch panel 105, and the storage 108 are connected to the input/output interface.

The display unit 104 is a display device that uses, for example, liquid crystal, EL (Electro-Luminescence), or CRT (Cathode Ray Tube).

The touch panel 105 functions as an input unit for receiving various instructions from the user 30. The touch panel 105 includes a detection unit, for example, a sensor portion (not shown) provided integrally with the display screen 3 and an operation circuit unit. When an operator 31 such as a finger of the user 30 (that being, a human appendage) comes close to or comes in contact with the display screen 3, an approach signal or a contact signal is output from the sensor portion to the operation circuit unit. Based on the approach signal or the contact signal thus output, the operation circuit unit generates, for example, an information piece on an approach position or a contact position of the operator 31 and information pieces on a moving direction, a moving amount, and a moving speed of the operator. In addition, for example, an information piece on a contact area of the operator 31 may be generated. The various information pieces thus generated are output, for example, to the CPU 106, and undergo predetermined processes by the CPU 106.

The touch panel 105 in this exemplary embodiment is a so-called multi-touch-type touch panel and is capable of detecting contacts or approaches of multiple operators with respect to the display screen 3. Then, contact-position information pieces and movement information pieces of the multiple operators are generated. Thus, for example, the user 30 can input various instructions by a pinching operation with two fingers. The pinching operation is such an operation as to simultaneously bring, for example, two fingers into contact with the display screen 3, and then open and close the two fingers. In this case, such an operation as to open two fingers held in contact with each other is referred to as, for example, a pinch-out operation, and such an operation as to close two fingers is referred to as, for example, a pinch-in operation.

The touch panel 105 used in this exemplary embodiment is of a capacitance type. However, touch panels of other types such as a resistive-film type, a surface-acoustic-wave type, and an infrared-type may also be used.

The storage 108 is a non-volatile storage device such as a hard disk drive (HDD), a flash memory, and other solid-state memories. A part or all of the RAM 107 and the storage 108 corresponds/correspond to a storage means of this exemplary embodiment.

Alternatively, the portable terminal 100 may include a read only memory (ROM) (not shown), and the storage means may include the ROM.

The portable terminal 100 may be provided with a drive unit and a communication unit (which are not shown). The drive unit is a device capable of driving removable recording media such as an optical recording medium, a floppy (registered trademark) disk, a magnetic recording tape, and a flash memory.

The communication unit is a modem, a router, and other communication devices that are capable of connecting with a LAN (Local Area Network) or a WAN (Wide Area Network) and used for communicating with other devices. Communication by the communication unit may either be by wires or wireless.

For example, the electronic book 50 stored in a recording medium is read out by the CPU 106 via the drive unit and displayed on the display screen 3. Alternatively, the electronic book 50 may be downloaded via the communication unit and displayed on the display screen 3.

Data processing by the portable terminal 100 is realized by software stored in the storage 108 and the like in cooperation with hardware resources of the portable terminal 100. Specifically, by the CPU 106 loading a program that is stored in the storage 108 and the like and constitutes software in the RAM 107 and executing it, various types of data processing are realized. In this exemplary embodiment, the CPU 106 functions as a setting unit, a processor, a display switching unit, and the like. Note that the RAM 107 includes an image-display video RAM (VRAM) (not shown).

Figure 3:
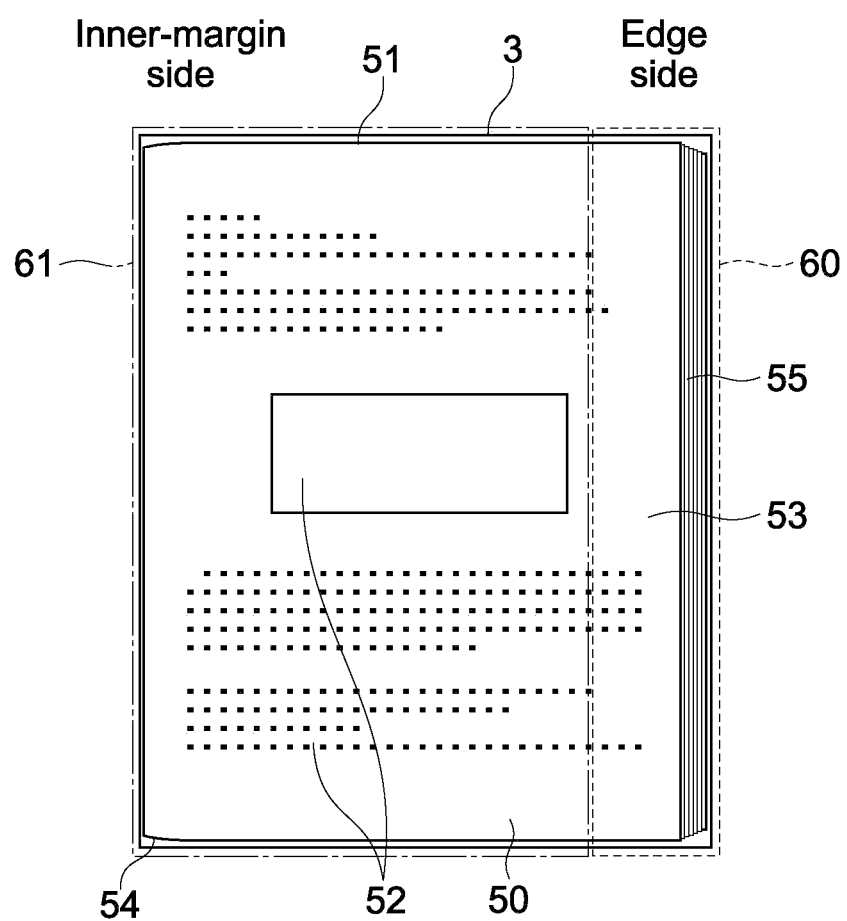
FIG. 3 is an explanatory view of an image displayed on a display screen of the portable terminal illustrated in FIG. 1.

FIG. 3 is an explanatory view of an image displayed on the display screen 3 of the portable terminal 100 according to an exemplary embodiment. For example, the electronic book 50 which has been read out from the recording medium or downloaded via the communication portion has multiple pages assigned with page numbers. Each of the pages contains content data of the contents. The content data includes text data and image data. Further, the electronic book 50 contains bibliographic data including a title, an author, a total page number, a thickness of a unit page, and left binding/right binding.

As illustrated in FIG. 3, on the display screen 3, there are displayed a page image 51 expressing a shape of a page and content data 52 contained in a predetermined page of the electronic book 50. By the content data 52 of the predetermined page being mapped to the page image 51, a display page 53 (that is, a first page) is displayed on the display screen 3. For example, when content data of a fourth page is mapped to a display page 53, the display page 53 is a fourth display page 53 of the electronic book 50.

The page image 51 displayed in this exemplary embodiment is left-bound and left-open. A bound portion 54 is displayed on a root side of the page image 51 (left side of FIG. 3). Meanwhile, an edge portion 55 corresponding to an edge of a real book is displayed on a leading end side of the page image 51 (right side of FIG. 3).

In this exemplary embodiment, the page image 51 is generated as a mesh map constituted of multiple polygons (not shown), and the content data 52 of each page of the electronic book 50 are attached as textures to the page image 51. By appropriately moving positions of vertexes of each of the polygons, for example, such a moving image (animation) that a part or all of the display page 53 is turned is generated and displayed on the display screen 3.

As illustrated in FIG. 3, invisible regions are set respectively on the right side of the display screen 3, that is, an edge side of the display page 53, and a side corresponding to an inner-margin side of a real book. The term "invisible" represents a state in which, for example, coloring for distinguishing the regions is not performed, and hence sizes of the regions and the edge portions are visually imperceptible to the user and cannot be visually recognized. With this, the user 30 is not hindered from browsing the content data 52. However, as long as browsing of the content data 52 is not hindered, the regions may be displayed so as to be visually recognized.

In this exemplary embodiment, the region on the edge side is set as a page-switching operation region 60 which is a region for a page-switching operation. The region on the inner-margin side is set as a page-zooming operation region 61 used for a page-zooming operation.

Sizes and positions of the page-switching operation region 60 and the page-zooming operation region 61 may be determined based on a predetermined pixel number or position coordinates on the display screen 3. Alternatively, the sizes and the positions may be appropriately set by the user 30.

It suffices that the page-switching operation region 60 is set in at least a part of the display screen 3, and a region except the page-switching operation region 60 may be arbitrarily used. As in this exemplary embodiment, when the region on the edge side is set as the page-switching operation region 60, an intuitive page-switching operation can be performed which is based on such an operation as to pinch the side corresponding to the edge side of a real book and turn pages.

Figure 4:
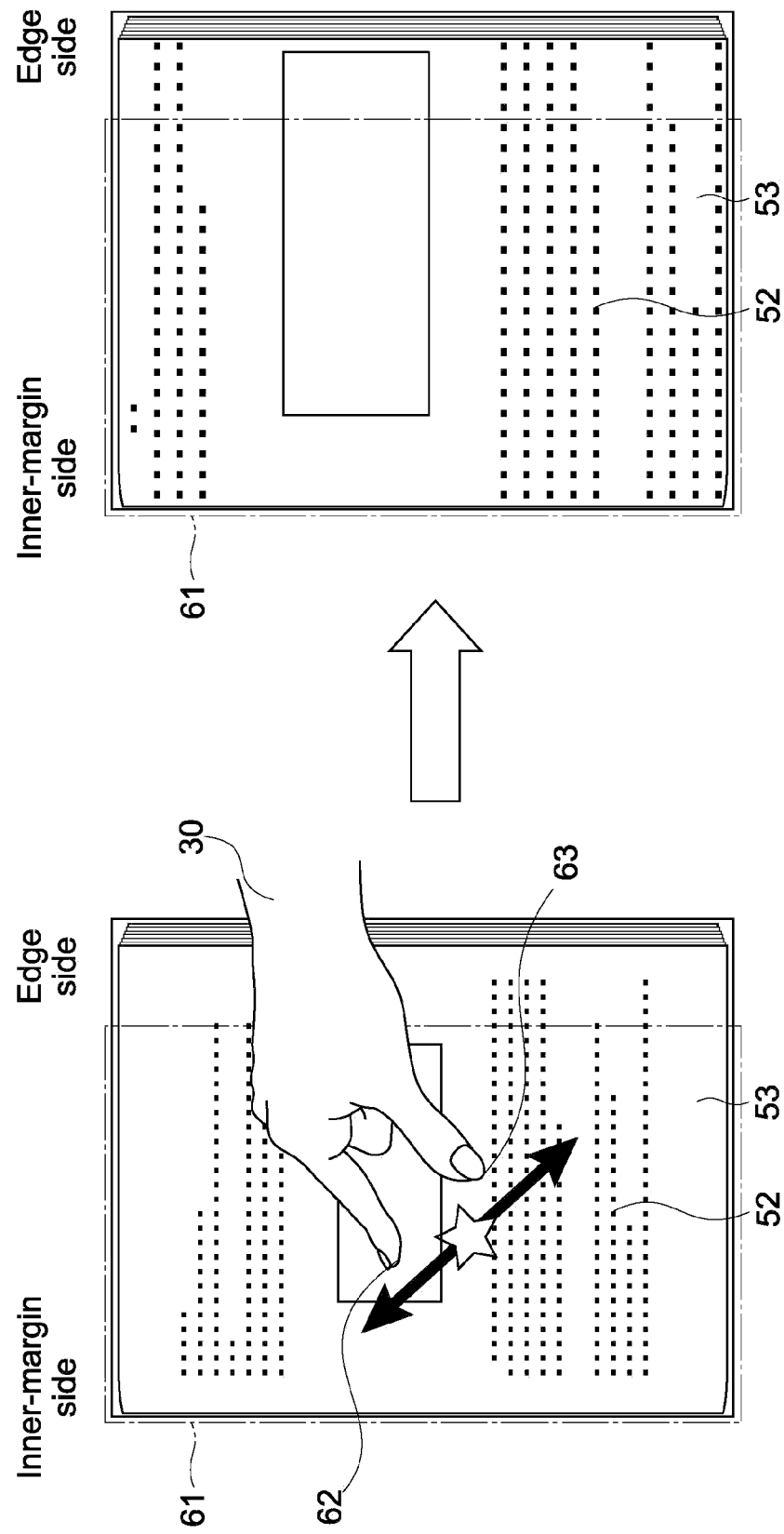
FIG. 4 is a schematic view for illustrating a page-zooming operation region.

FIG. 4 is a schematic view for explaining the page-zooming operation region 61. As illustrated in FIG. 4, the pinch-out operation is performed on the page-zooming operation region 61 by the user 30. Then, the content data 52 in the display page 53 is displayed in a zoomed manner. For example, a zoom rate of the content data 52 is set based on a variation in a distance between touch positions 62 and 63 of two fingers. Typically, the content data 52 is zoomed more as the distance between the touch positions 62 and 63 increases. When the pinch-in operation is performed on the page-zooming operation region 61 by the user 30, the content data 52 is displayed in a reduced manner based on the variation in the distance between touch positions 62 and 63.

b. Operation of Information Processing Apparatus

Figure 5:
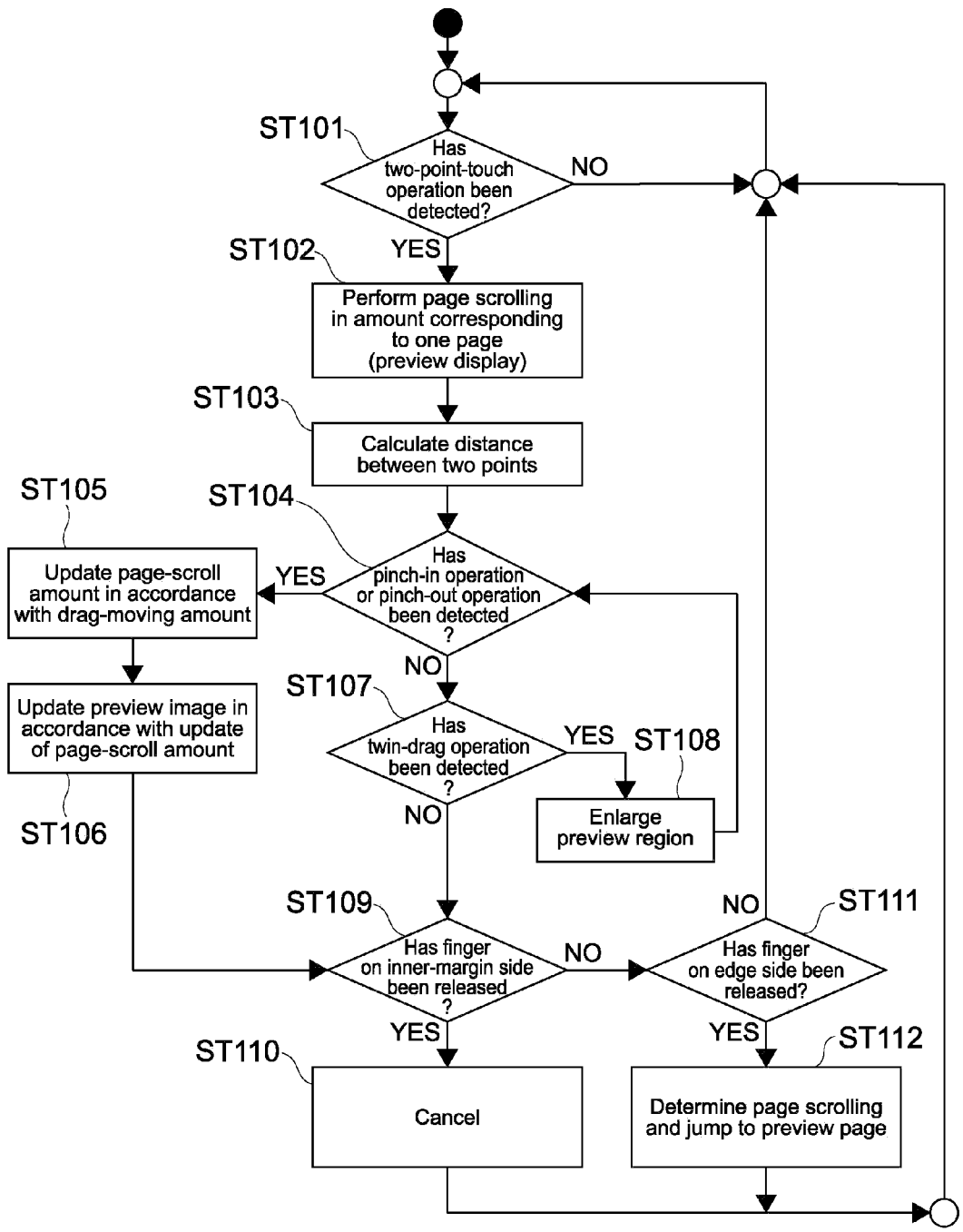
FIG. 5 is a flowchart showing an operation of the portable terminal as the information processing apparatus according to the first exemplary embodiment.

FIG. 5 is a flowchart showing an operation of the portable terminal 100 as the information processing apparatus according to an exemplary embodiment. Here, a description is made on the operation of the portable terminal 100 at the time when a multi-touch operation is performed with respect to the above-mentioned page-switching operation region 60.

Figure 6:
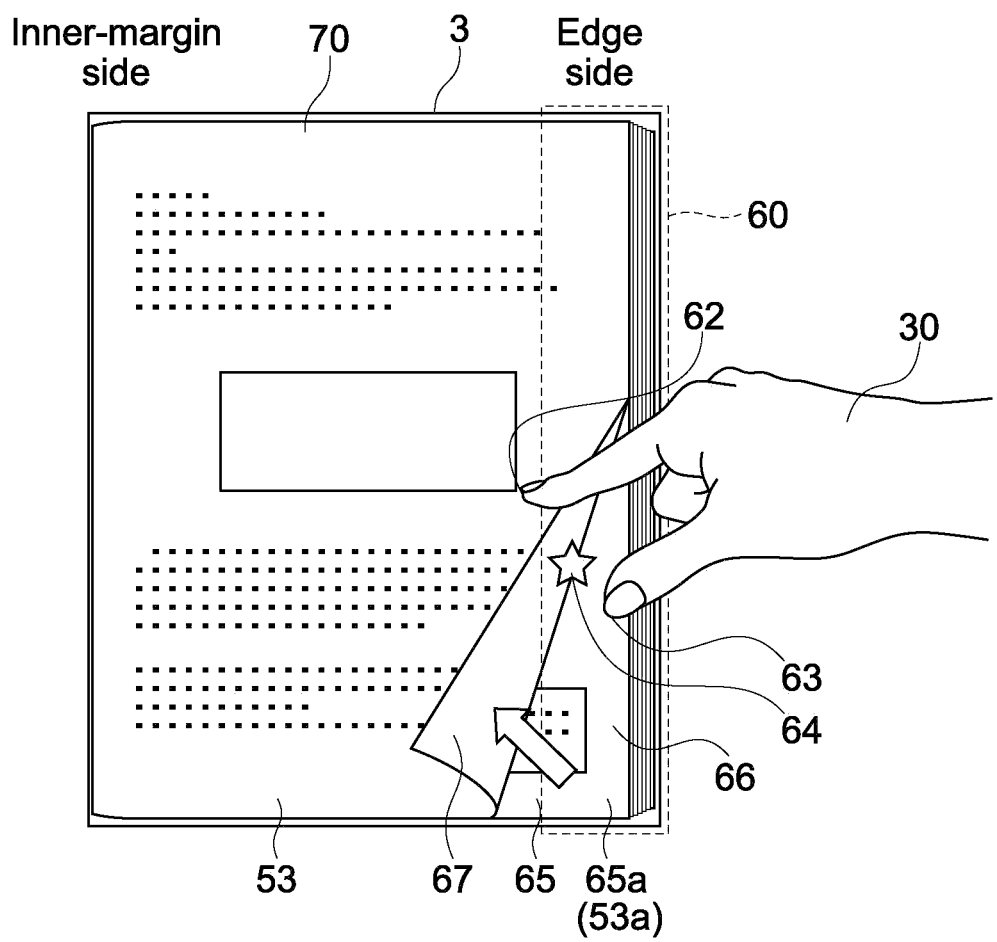
FIG. 6 is a schematic view illustrating a timing when a multi-touch operation with respect to the page-zooming operation region illustrated in FIG. 3 is detected.

First, a judgment is made as to whether or not a type of user activation, for example, a multi-touch operation such as two-point-touch operation, with respect to the page-switching operation region 60 has been detected (ST101). FIG. 6 is a schematic view illustrating a timing when the multi-touch operation with respect to the page-zooming operation region 60 is detected.

As illustrated in FIG. 6, in this exemplary embodiment, a judgment is made as to whether or not an intermediate position 64 between the respective touch positions 62 and 63 of two fingers is within a pre-determined portion of the display screen, that is, the page-switching operation region 60. When the intermediate position 64 between the touch positions 62 and 63 is within the page-switching operation region 60, the multi-touch operation with respect to the page-switching operation region 60 is detected. When the intermediate position 64 is out of the page-switching operation region 60, the multi-touch operation with respect to the page-switching operation region 60 is not detected.

However, detecting conditions of the multi-touch operation with respect to the page-switching operation region 60 can be appropriately set. For example, the multi-touch operation may be detected when both the two touch positions 62 and 63 are within the page-switching operation region 60. Alternatively, the multi-touch operation may be detected when, of the two touch positions 62 and 63, the touch position 63, which is positioned more approximately to the edge side (positioned on the right side of the display screen 3), is within the page-switching operation region 60. Appropriate setting of the detecting conditions with main focus on the touch position 63 positioned on the edge side enables an intuitive operation to be made based on such an operation as to apply a finger to an edge of a real book.

Then, page scrolling in an amount corresponding to one page is performed, and a part of the next page is previewed (ST102). As illustrated in FIG. 6, there is displayed a scrolling image 70 as a partially replaced image in which a part 53a of the display page 53 displayed on the display screen 3 is replaced with a part 65a of a next page 65 (this is, a first successive page) as a destination candidate. The part 65a of the next page 65 in the scrolling image 70 corresponds to a preview image 66 (that is, a first successive page preview), and the user 30 can view the preview image 66 within a corresponding region of display screen 3 for search for a target page.

In this exemplary embodiment, such a moving image that the part 53a of the display page 53 is turned is displayed, and a turned part is replaced with the part 65a of the next page 65 (preview image 66). The display page 53 is turned over to the intermediate position 64 between the two touch positions 62 and 63. Further, a state in which the part 53a of the display page 53 is turned is displayed by an emphasis image 67, which emphasizes that the preview image 66 of the next page 65 as the destination candidate is displayed at a turned part. With this, contents of a destination page can be easily understood, and a target page can be searched for with high operability. Further, intuitive page-searching operation and page-switching operation in which, as in a real book, a part of a page is pinched and the pinched part is turned for search for a target page can be performed.

The emphasis image 67 is not limited to an image that expresses the state in which the part 53a of the display page 53 is turned. For example, an image such as a colored frame may be displayed as an emphasizing image, for example, around the preview image 66. Note that, in this exemplary embodiment, the display page 53 is turned over to the intermediate position 64 (that being, an activation position) between the two touch positions 62 and 63 (that being, the first and second contact positions). However, this should not be construed restrictively. For example, the display page 53 may be turned over to a position of either one of the two touch positions 62 and 63. Alternatively, a position up to which the display page 53 is turned, that is, a size and a shape of the preview image 66 can be appropriately set.

Next, the distance between the two touch positions 62 and 63 (that is, a first displacement) is calculated, for example, in pixel units (ST103).

Then, a judgment is made as to whether or not the pinch-in operation by the user 30 has been detected (ST104). In a case where the pinch-in operation has been detected, a page-scroll amount is judged based on respective drag-moving amounts of two fingers, that is, the variation in the distance between the two touch positions 62 and 63, and the page-scroll amount is updated (ST105). Next, the preview image 66, which is previewed in ST102, of the next page 65 is updated to a preview image 69 of a page 68 as a new destination candidate (that is, a second successive page) (ST106) (refer to FIG. 7). Update of the preview image 66 corresponds to an update of the scrolling image 70.

Figure 7:
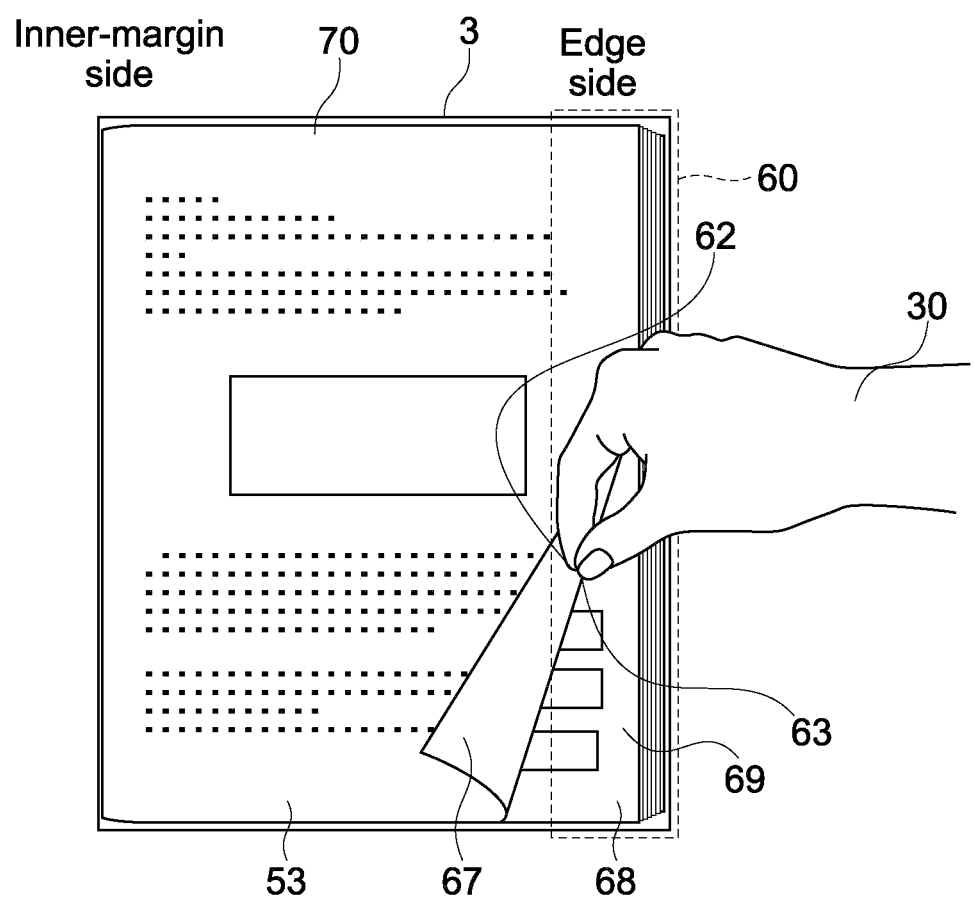
FIG. 7 is a schematic view of a display screen to which a pinch-in operation is performed in the state illustrated in FIG. 6.
Figure 8:
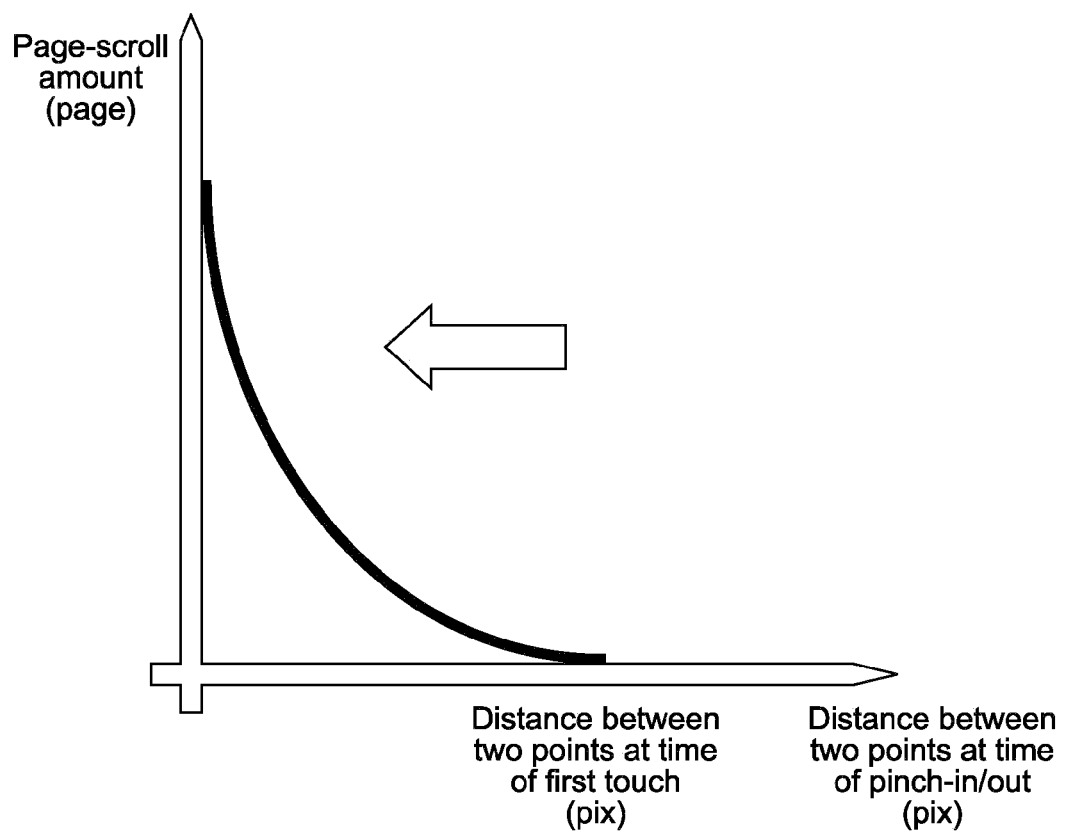
FIG. 8 is a graph showing a relative relation between a distance between two touch positions illustrated in FIG. 6 and a page-scroll amount.
Figure 9:
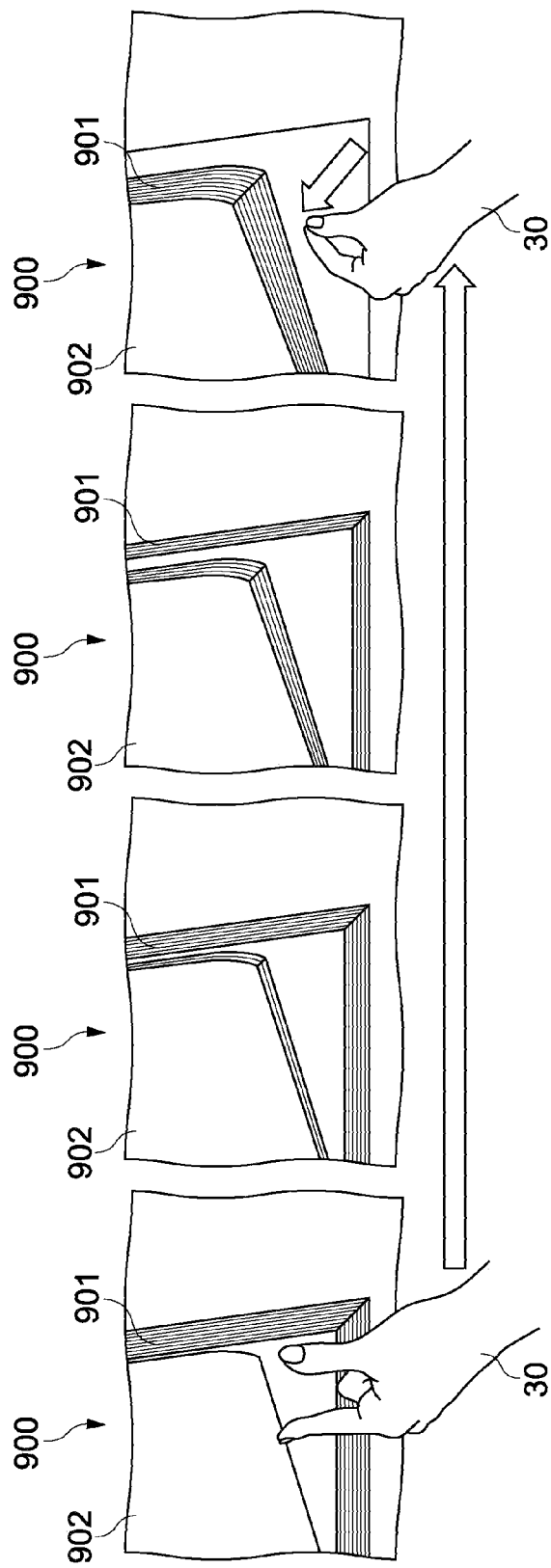
FIG. 9 illustrates verification of such an operation as to search for a page by pinching and turning pages of a real book.

In FIGS. 7 to 9, the update process of the preview image by the pinch-in operation is illustrated in detail. FIG. 7 is a schematic view of the display screen 3 at the time when the pinch-in operation is performed, and FIG. 8 is a graph showing a relative relation between the distance between the two touch positions 62 and 63 and the page-scroll amount.

As illustrated in FIGS. 7 and 8, as the distance between the two touch positions 62 and 63 (that is, a second displacement) becomes smaller (that is, the ratio of the second displacement to the first displacement decreases), the page-scroll amount (that is, a number of pages between a first page and the second successive page) increases. That is, as two fingers are brought closer to each other, the page 68 which is subsequent to and farther from the display page 53 is previewed. Further, as the distance between the touch positions 62 and 63 increases when the page-switching operation region 60 is touched first, a range in which the page-scroll amount varies becomes larger. As a result, more pages can be scrolled at one time. At each update of the preview image 66 or 69, such an animation that pages are flipped through may be displayed. Alternatively, only the preview image 66 or 69 may be updated.

With regard to an amount of the variation in the distance between the two touch positions 62 and 63, setting may be appropriately made as to how much the page-scroll amount is varied. For example, such a setting can be made that the scroll amount increases by one page when the two touch positions 62 and 63 come close to each other by a predetermined pixel.

Such a touch operation as to appropriately vary the distance between the two touch positions 62 and 63 enables the preview image 66 or 69 respectively representing the page 65 or 68 as a destination in the scrolling image 70 as a partially replaced image to be changed. As a result, intuitive page-searching operation and page-switching operation onto which such an operation as to flip through pages for search for a target page as in a real book is reflected can be performed.

Note that, when the pinch-out operation is performed by the user 30, for example, during a page-update process, the page-scroll amount may be reduced. That is, a page previous to a page being previewed may be previewed.

FIG. 9 illustrates a verification of such an operation as to search for a target page by pinching and turning pages of a real book. In a real book 900, for scrolling of more pages, it is necessary to pinch many pages 902 near an edge 901. As illustrated in FIG. 9, in this exemplary embodiment, such an operation as to pinch many pages 902 is associated with such an operation as to bring two fingers of the user 30 close to each other. Thus, such a setting is made that the page-scroll amount becomes larger when two fingers are brought close to each other, which enables intuitive operations to be made.

In a case where the pinch-in operation has not been detected in ST104, a judgment is made as to whether or not a twin-drag operation by the user 30 has been detected (ST107). The twin-drag operation is a drag operation made while the distance between two fingers are maintained to be substantially constant by the user 30. By this twin-drag operation, the touch positions 62 and 63 move while maintaining the distance therebetween.

Figure 10:
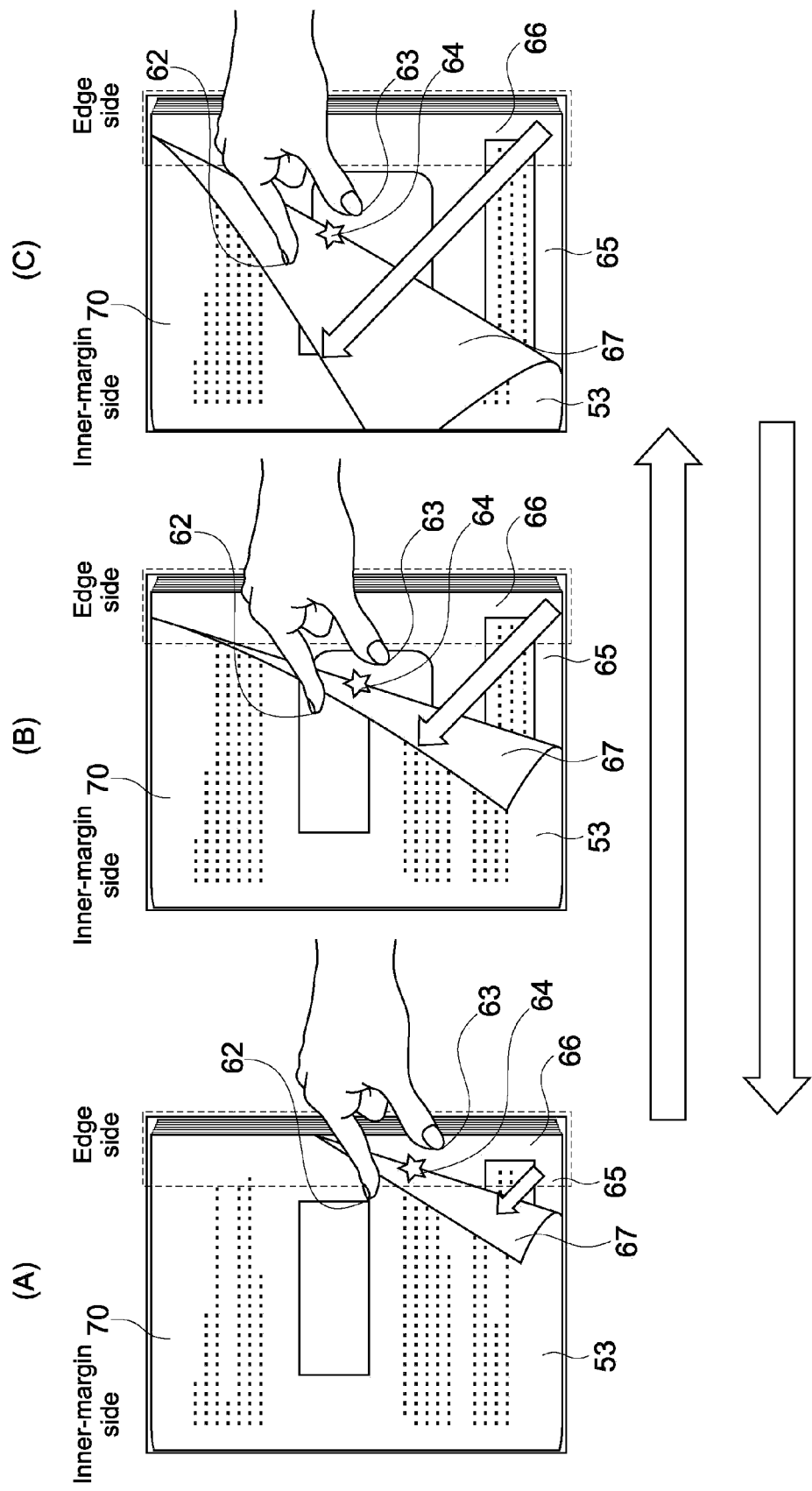
FIG. 10 is a schematic view of a scrolling image at the time when a twin-drag operation by a user is detected.

FIG. 10 is a schematic view of the scrolling image 70 at the time when the twin-drag operation is detected. When the twin-drag operation is performed in such a manner that a state illustrated in Part (A) of FIG. 10 is shifted to a state illustrated in Part (B) of FIG. 10, a size of a preview image of a destination page in the scrolling image 70 varies in accordance with moving amounts of the two touch positions 62 and 63. In this case, the next page 65 is displayed as a destination page, and the preview image 66 of the next page 65 is displayed. In this exemplary embodiment, the display page 53 is further turned following movements of the two touch positions 62 and 63 and the intermediate position 64. With this, a size of the preview image 66 displayed after the turned part becomes larger, and a shape of the emphasis image 67 varies in accordance therewith (ST108).

In the state illustrated in Part (C) of FIG. 10, the display page 53 is still further turned and the size of the preview image 66 is larger. When the twin-drag operation is performed in such a manner that the state illustrated in Part (C) of FIG. 10 is shifted to the state illustrated in Part (A) of FIG. 10, the size of the preview image 66 may become smaller.

In this way, the size of the preview image 66 varies by the twin-drag operation by the user 30. As a result, the page 65 as a destination can be viewed well, thus facilitating search for a target page. Further, intuitive operations which are based on such an operation as to largely turn a page so that another page can be viewed well as in a real book can be performed.

In the flowchart shown in FIG. 5, when the pinch-in operation has not been detected in ST104, the judgment is made as to whether or not the twin-drag operation has been detected. Then, after the size of the preview image 66 is changed by the twin-drag operation, the judgment is made again as to whether or not the twin-drag operation has been detected. That is, the page-scroll amount and the preview image are updated after the size of the preview image is changed. However, for example, after the page-scroll amount and the preview image are updated once by the pinch-in operation, the size of the preview image may be changed by the twin-drag operation. That is, an operation obtained by an appropriate combination of the pinch-in operation (pinch-out operation) and the twin-drag operation may be performed by the user 30.

Figure 11:
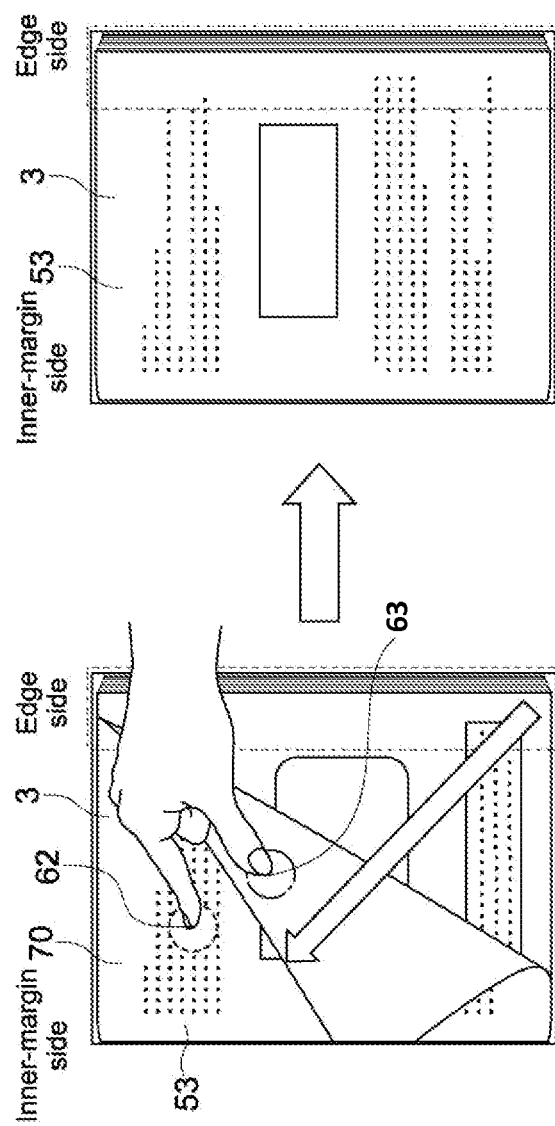
FIG. 11 is an explanatory view of a operation method for a determination of execution of a page-switching process.
Figure 12:
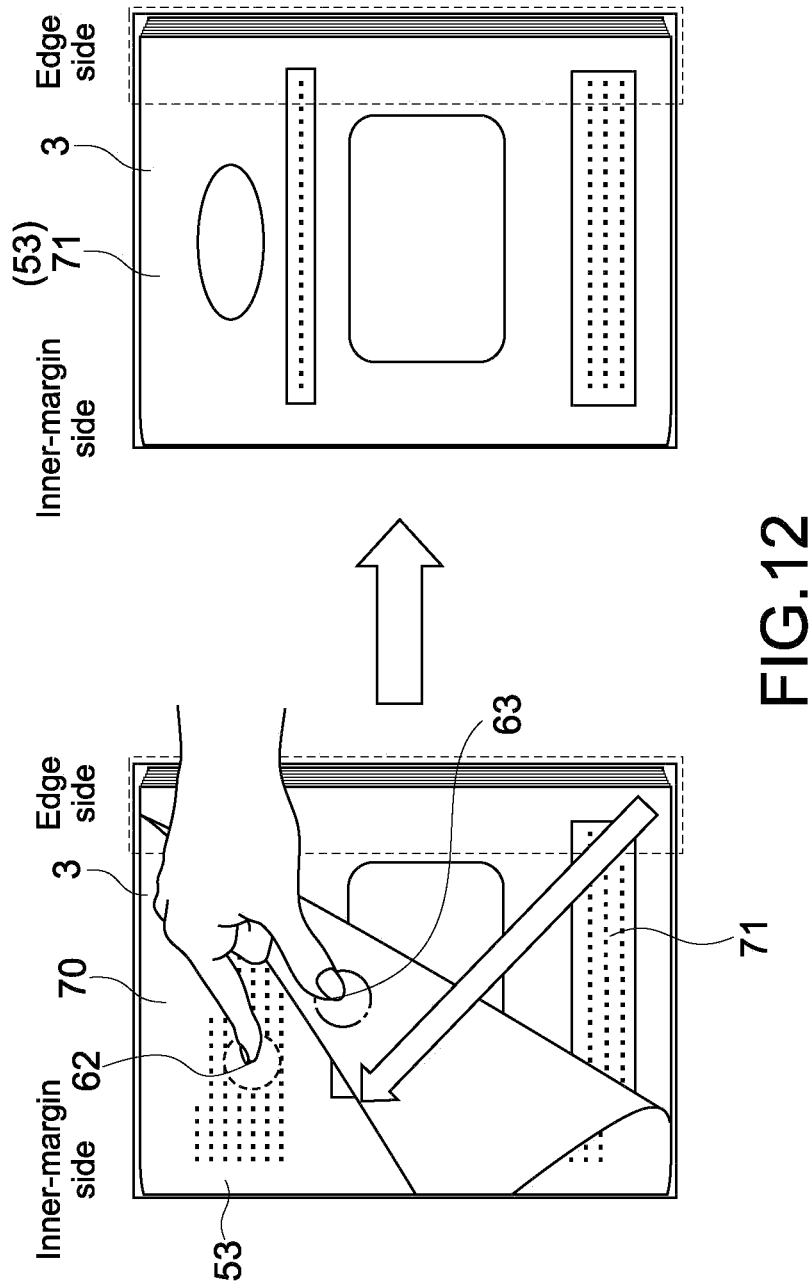
FIG. 12 is an explanatory view of a operation method for a determination of cancellation of the page-switching process.

FIGS. 11 and 12 are explanatory views of operation methods for determining execution and cancellation of a page-switching process. Of the two fingers illustrated in FIG. 11, when a finger near the inner-margin side of the display page 53 is released first (that is, contact is lost between the first human appendage and the display surface), that is, when a release operation is performed first at the touch position 62 (Yes in ST109), the page-switching process is cancelled (ST110). As a result, as illustrated in FIG. 11, the scrolling image 70 displayed on the display screen 3 is switched to an image of the display page 53 which has been displayed prior to the multi-touch operation.

Of the two fingers, when a finger near the edge side of the display page 53 is released first (that is, contact is lost between the second human appendage and the display surface), that is, when a release operation is performed first at the touch position 63 (Yes in ST111), the page-switching process is executed (ST112). That is, a page 71 being previewed is determined as a destination page. As a result, as illustrated in FIG. 12, the scrolling image 70 displayed on the display screen 3 is switched to an image of the page 71, which has been displayed, as a destination. The image of the page 71 is displayed as an image of a new display page 53.

In this way, of the two touch positions 62 and 63, the page-switching process may be executed by the release operation at the one touch position 63, and the page-switching process may be cancelled by the release operation at the other touch position 62.

In this exemplary embodiment, when the finger near the edge side is released first, the page-switching process is executed. This setting is made based on such an operation as to switch, as in a real book, a page by flicking up the page with a lower finger of the fingers pinching the pages. Meanwhile, when the finger near the inner-margin side is released first, the page-switching process is cancelled. This setting is made based on such an operation as to open again a page displayed with an upper finger of the fingers pinching the pages. With this, intuitive operations can be performed in this exemplary embodiment. Note that, when the release operations are simultaneously performed at the two touch positions 62 and 63, the page-switching process may be executed or cancelled.

With respect to the two touch positions 62 and 63, assignments of interactions of the execution and cancellation of the page-switching process can be appropriately set. In the above-mentioned case, the interactions are assigned based on positions in a lateral direction of the display screen 3. However, the interactions may be assigned based on positions in a vertical direction of the display screen 3. For example, the execution of the page-switching process may be assigned to a release operation at a touch position near a top side of the display page 53 (upper side of FIG. 11), and the cancellation of the page-switching process may be assigned to a release operation at a touch position near a bottom side of the display page 53 (lower side of FIG. 11).

Further, a difference in the lateral direction between the two touch positions and a difference in the vertical direction therebetween are calculated. Then, based on coordinates of the touch positions in the direction involving a larger difference, the interactions of the execution and cancellation of the page-switching process may be respectively assigned. For example, when the difference in the vertical direction is larger, the execution of the page-switching process is assigned to a lower touch position, and the cancellation of the page-switching process is assigned to an upper touch position. When the difference in the lateral direction is larger, the execution of the page-switching process is assigned to a right touch position, and the cancellation of the page-switching process is assigned to a left touch position. In this way, a positional relation between the two touch positions may be appropriately judged, and the execution and the cancellation of the page-switching process may be respectively assigned based on the positional relation.

With respect to the two touch positions, the execution of the page-switching process is assigned to a touch position near a position as a page-turning starting point (lower right corner of the display page 53 in this exemplary embodiment). With this, an intuitive operation based on operations with respect to a real book can be performed.

As described above, in the portable terminal 100 as the information processing apparatus according to this exemplary embodiment, the page-switching operation region 60, which is an invisible region for the page-switching operation, is provided on the display screen 3. Based on the touch operation with respect to the page-switching operation region 60, the scrolling image 70 which is a partially replaced image is generated. With this, the user 30 can view a part of the page 65 or 69 as a destination within the scrolling image 70 for search for a target page, and switch the page displayed on the display screen 3 to the searched target page. As a result, without using dedicated hardware devices or GUI components for switching pages, the page-searching operation and the page-switching operation can be performed with high operability.

Further, in this exemplary embodiment, the page-switching operation region 60 and the page-zooming operation region 61 are set in the display screen 3. Such region partitioning enables a zooming-reducing process of the display page 53 and the page-switching process of the display page 53 to be executed also by the pinch-in operation and the pinch-out operation. With this, the user 30 can intuitively execute the page-switching process not by a special operation method but by a familiar operation method.

2. Second Exemplary Embodiment

A description is made on an information processing apparatus according to a second exemplary embodiment by way of an example of a portable terminal. In the description below, description on structures and operations that are the same as those of the portable terminal 100 described in the first exemplary embodiment is omitted or simplified.

Figure 13:
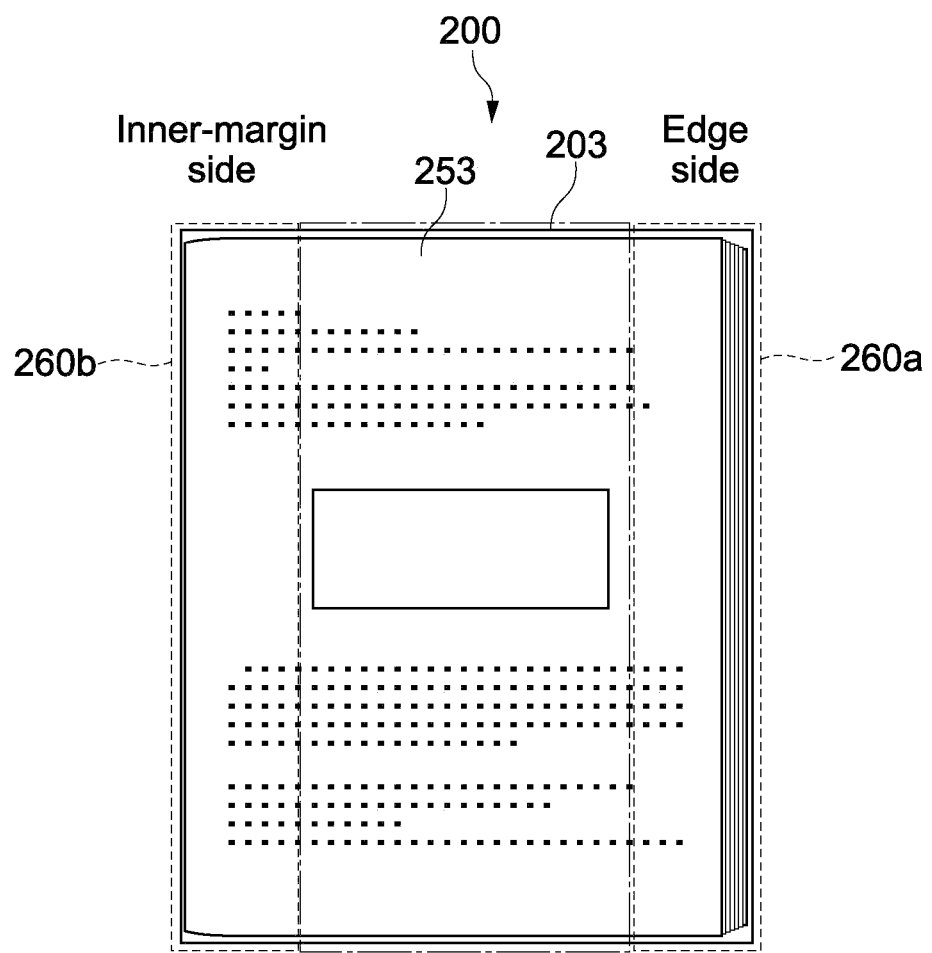
FIG. 13 is a schematic view of a display screen of a portable terminal according to a second exemplary embodiment.

FIG. 13 is a schematic view of a display screen 203 of a portable terminal 200 according to this exemplary embodiment. In this exemplary embodiment, page-switching operation regions 260a and 260b are set respectively on an edge side and an inner-margin side of the display screen 203. The page-switching operation region 260a set on the edge side is similar to the page-switching operation region 60 described in the first exemplary embodiment.

The page-switching operation region 260b set on the inner-margin side is used for a page-switching operation in a reverse direction. That is, the page-switching operation region 260b is used for searching for a page previous to a display page 253 being displayed, and switching to the previous page.

Figure 14:
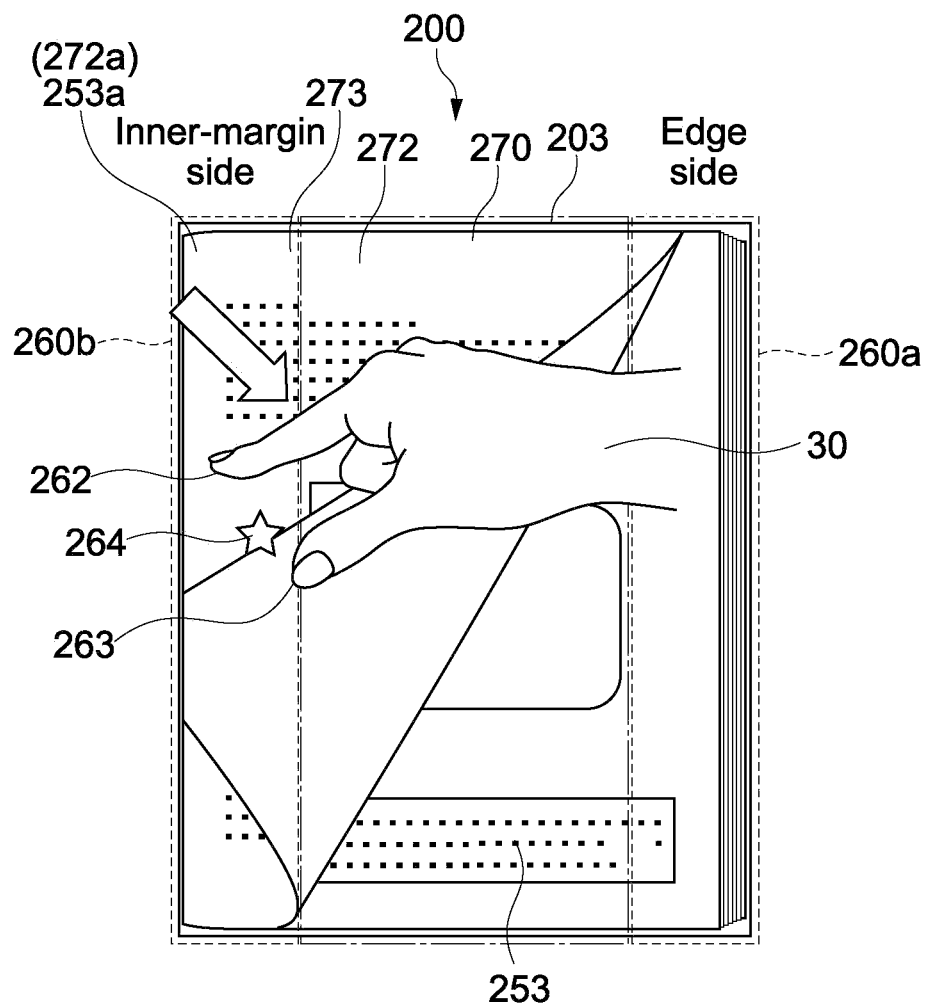
FIG. 14 is an explanatory view of an operation of a page-switching process into a reverse direction by a touch operation with respect to a left page-switching operation region illustrated in FIG. 13.

FIG. 14 is an explanatory view of an operation of a page-switching process in the reverse direction. As illustrated in FIG. 14, the multi-touch operation is performed with respect to the page-switching operation region 260b set on the inner-margin side. Then, such a moving image that one previous page 272 is turned from a left side of the display page 253 onto the display page 253 is displayed. As a result, a scrolling image 270 in which a part 253a of the display page 253 is replaced with a part 272a of the previous page 272 is displayed. In this exemplary embodiment, the previous page 272 is turned over to an intermediate position 264 between two touch positions 262 and 263.

The part 272a of the previous page 272 in the scrolling image 270 corresponds to a preview image 273, and the user 30 can view the preview image 273 for search for a target page.

Based on a variation in a distance between the two touch positions 262 and 263, a page-scroll amount is updated, and the preview image 273 is updated in accordance therewith. Further, a size of the preview image 273 is changed by the twin-drag operation.

As described above, in the portable terminal 200 in this exemplary embodiment, by the touch operation performed with respect to the page-switching operation region 260a on the edge side, a page-scrolling operation can be performed in a forward direction. Further, by the touch operation performed with respect to the page-switching operation region 260b on the inner-margin side, a page-scrolling operation in the reverse direction can be performed. Thus, the page-searching process and the page-switching process can be performed with respect to all the pages in an electronic book.

3. Third Exemplary Embodiment

Figure 15:
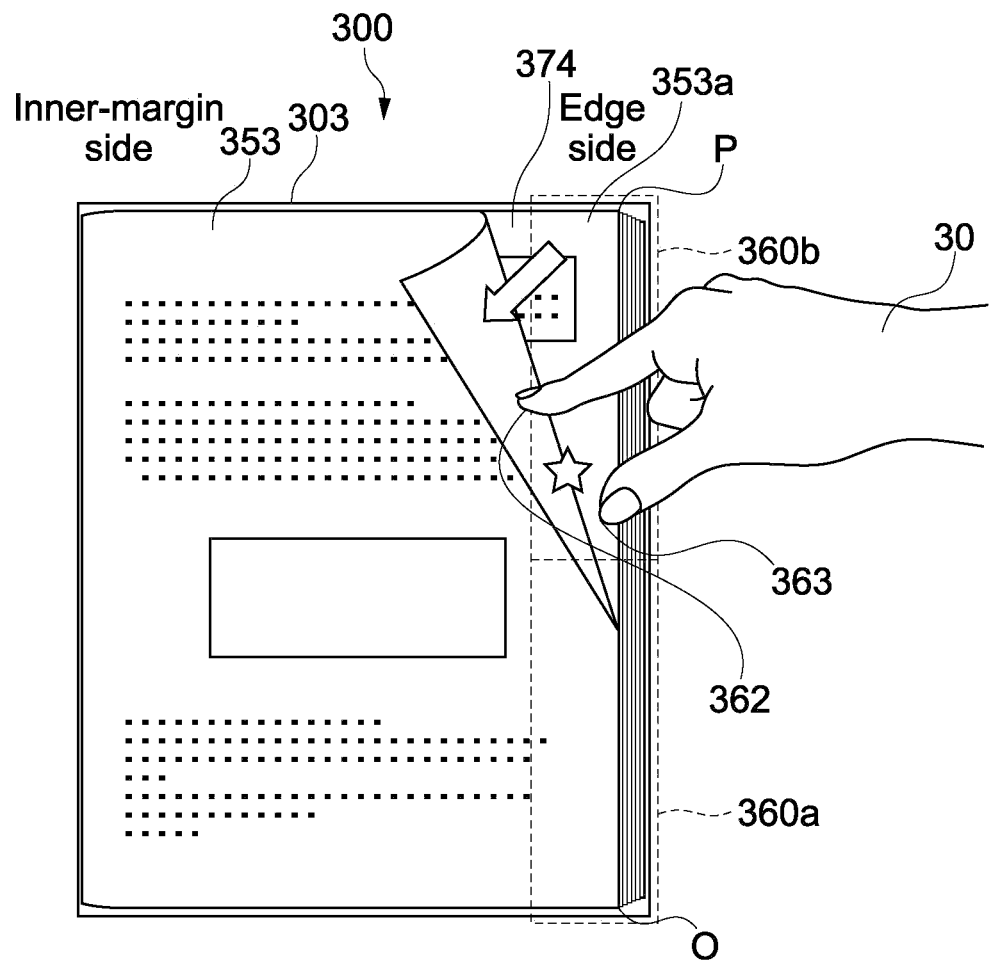
FIG. 15 is a schematic view of a display screen of a portable terminal according to a third exemplary embodiment.

FIG. 15 is a schematic view of a display screen 303 of a portable terminal 300 as an information processing apparatus according to a third exemplary embodiment. In the portable terminal 300 according to this exemplary embodiment, a page-switching operation region 360 set on an edge side of the display screen 303 is further partitioned into two regions 360a and 360b. In other words, the regions 360a and 360b partition the page-switching operation region 360 into two regions (that is, sub-portions) in a vertical direction of the display screen 303.

When a multi-touch operation is performed with respect to the region 360a as a lower half region of the page-switching operation region 360, as described in the first exemplary embodiment, such a moving image is displayed that a part of a display page 353 is turned from a lower right corner O of the display page 353, and a preview image is displayed.

When a multi-touch operation is performed with respect to the region 360b as an upper half region of the page-switching operation region 360, as illustrated in FIG. 15, such a moving image that another part 353a of the display page 353 is turned from an upper right corner P of the display page 353 is displayed. Then, a preview image 374 of a destination page is displayed.

In this way, the display page is turned from both the lower side and the upper side of the display page 353, and the preview image of the destination page is displayed. With this, a target page can be searched for on both the lower side and the upper side of the page, and hence the user 30 can intuitively execute the page-searching operation and the page-switching operation with high operability.

Note that, when the upper side of the display page 353 is turned as illustrated in FIG. 15, of two touch positions 362 and 363, a release operation at a touch position near the upper right corner P of the display page 353 may be assigned with an execution process of the page-switching operation.

4. Other Exemplary Embodiments

However, exemplary embodiments of the present disclosure are not limited to those described above. Other various exemplary embodiments may be carried out.

In the above-mentioned first exemplary embodiment, the judgment is made in ST104 shown in FIG. 5 as to whether or not the pinch-in operation has been detected. Then, in the case where the pinch-in operation has been detected, the page-scroll amount is updated, and then the preview image is updated. In the first exemplary embodiment, the page-scrolling operation is performed in a forward direction from a display page to a page subsequent thereto.

However, a judgment may be made in ST104 as to whether or not the pinch-in operation and the pinch-out operation have been detected. In a case where the pinch-out operation by the user has been detected, the page-scrolling operation is performed in the reverse direction from the display page to a previous page. It suffices that the image similar to the scrolling image 270 illustrated in FIG. 14 is used as the scrolling image for the page scrolling in the reverse direction. In this way, such a setting may be made that both the page-scrolling operation in the forward direction and the page-scrolling operation in the reverse direction can be performed.

FIG. 16 are schematic views of a display screen 403 of a portable terminal 400 as an information processing apparatus according to another exemplary embodiment. In the portable terminal 400, a page 453 corresponding to two pages is displayed on the display screen 403 in a two-page spread manner. FIG. 16 illustrate a left-bound and leftward-open electronic book 450.

As illustrated in FIG. 16, page-switching operation regions 460a and 460b are set respectively on edge sides at both ends of the display page 453 displayed in a two-page spread manner. In addition, a page-zooming operation region 461 is set on an inner-margin side of the display page 453 positioned between the two page-switching operation regions 460a and 460b.

As illustrated in FIG. 16A, when a touch operation is performed with respect to the page-switching operation region 460a set at the right end portion of the display page 453, the page-switching operation is performed in the forward direction. As illustrated in FIG. 16B, when a touch operation is performed with respect to the page-switching operation region 460b set at the left end portion of the display page 453, the page-operation is performed in the reverse direction.

In ST105 shown in FIG. 5, the page-scroll amount is updated based on the variation in the distance between the two touch positions. At this time, the moving speed of each of the touch positions may be reflected on a determination of the page-scroll amount. For example, even when the distance between the touch positions is maintained, the page-scroll amount may be set to be large in a case where the moving speeds are high. With this, for example, the user can appropriately set the page-scroll amount by controlling such a speed as to bring two fingers close to each other.

In the above-mentioned case, as illustrated in FIG. 3, the bound portion 54 is displayed on the root side of the page image 51, and the edge portion 55 is displayed on the leading end side of the page image 51. The edge portion 55 does not need to be displayed so that the content data 52 is displayed across the lateral direction of the display screen 3. Also in this case, it suffices that the page-switching operation region 60 is set on the right side (edge side) on the display screen 3.

In ST101 and ST102 shown in FIG. 5, when the multi-touch operation with respect to the page-switching operation region is detected, the partially replaced image is displayed and the next page is previewed. However, the distance between the two touch positions may be calculated, and a page which is distant from a display page by an amount corresponding to the calculated distance may be previewed. When the two touch positions are brought close to each other, pages between the previewed page and the display page may be sequentially previewed.

In the above-mentioned case, the pinch-in operation, the pinch-out operation, and the twin-drag operation are performed as the touch operation with respect to the page-switching operation region. However, those touch operations are mere examples, and other various touch operations may be performed. Further, there may be employed a touch operation with one operator or a multi-touch operation with three or more operators. For example, the scrolling image may be displayed by tapping the page-switching operation region with the one operator. Then, in accordance with a drag operation with the one operator, the page-scroll amount and the preview image may be updated.

In the above-mentioned case, such a moving image that parts of a page image and a display image which express a shape of a page are turned is displayed as 3D animation images that use multiple polygons. However, for example, 2D animation images using an affine transformation or the like may also be displayed.

In the above-mentioned case, a touch panel is used as the input unit. However, for example, the touch operations by the user may be input via a touch pad provided separately from the display screen.

Even when the content data of the display page is displayed, the page-searching process and the page-switching process can be executed by the touch operations with respect to the page-switching operation region described above. Further, zoomed content data may be displayed as a preview image.

In the above-mentioned case, in order to perform an intuitive page-switching operation, the page-switching operation region is set on the edge side of the display page. However, the page-switching operation region may be set at other positions on the display screen.

The present disclosure contains subject matter related to that disclosed in Japanese Priority Patent Application JP 2010-224770 filed in the Japan Patent Office on Oct. 4, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a display unit configured to display content to a user, the display unit comprising a display surface, the content being associated with at least a portion of a first page of an electronic document;
a detection unit configured to detect a type of user activation, the type of user activation being associated with an activation position on the display surface, wherein the user activation comprises (i) a first contact between a first human appendage and the display surface and (ii) a second contact between a second human appendage and the display surface; and
a control unit configured to:
determine whether the activation position falls within a predetermined portion of the display screen, the predetermined portion being visually imperceptible to the user; and
identify a first successive page of the electronic document based on at least the type of user activation, when the activation position falls within the predetermined portion.

2. The information processing apparatus of claim 1, wherein:
the control unit is further configured to generate a signal to display a preview of the first successive page, the preview comprising at least a portion of the first successive page; and
in response to the generated signal, display the preview to the user within a corresponding region of the display screen.

3. The information processing apparatus of claim 2, wherein detection unit is further configured to:
detect the first and second contacts on the display surface; and
identify positions on the display surface associated with the first and second contacts, the first contact position being separated from the second contact position by a corresponding first displacement, and the activation position being disposed between the first and second contact positions along a direction of displacement.

4. The information processing device of claim 3, wherein the detection unit is further configured to:
detect movements of the first contact position and the second contact position; and
determine, based on the detected movements, a second displacement separating the first and second contact positions.

5. The information processing apparatus of claim 4, wherein the control unit is further configured to determine whether the second displacement is equivalent to the first displacement.

6. The information processing device of claim 5, wherein the control unit is further configured to identify, based on second displacement, a second successive page of the electronic document, the first and second successive pages being separated within the electronic document by a corresponding number of pages.

7. The information processing apparatus of claim 6, wherein the number of pages separating the first and second successive pages varies inversely with a ratio of the second displacement to the first displacement.

8. The information processing apparatus of claim 6, wherein:
the control unit is configured to generate a signal to display a preview of the second successive page, the second successive page preview comprising at least a portion of the second successive page; and in response to the generated signal, display the second successive page preview to the user within the corresponding region of the display screen, the second successive page preview replacing the first successive page preview.

9. The information processing apparatus of claim 6, wherein the control unit is configured to:
  determine a distance corresponding to the movement of at least one of the first or second contact positions, when the first and second displacements are equivalent;
  select, based on the distance, an additional portion of the first successive page; and
  generate a signal to display an enlarged preview of the first successive page to the user, the enlarged preview comprising content associated with the first successive page preview and with the additional portion.

10. The information processing apparatus of claim 3, wherein:
  the detecting unit is further configured to detect a loss of contact between the first human appendage and the display surface;
  the control unit is further configured to generate a signal to replace the first successive page preview with additional content associated with the first page; and
  the display unit is configured to display the additional content to the user within the corresponding region.

11. The information processing apparatus of claim 3, wherein:
  the detecting unit is further configured to detect a loss of contact between the second human appendage and the display surface;
  the control unit is further configured to:
    select, in response to the loss of contact, the first successive page of the electronic document for display to the user; and
    generate a signal to replace the content associated with the first page with content associated with the first successive page; and
  the display unit is further configured to display the content associated with the first successive page to the user.

12. The information processing apparatus of claim 2, wherein:
  the pre-determined portion comprises first and second sub-portions, the first and second sub-portions being visually imperceptible to the user; and
  the control unit is further configured to:
    determine whether the activation position falls within the first sub-portion or the second sub-portion; and
    generate, based on the determination, a signal to display the first successive page preview in a position proximate to a corresponding one of the first and second sub-portions.

13. The information processing apparatus of claim 2, wherein the display screen comprises a first predetermined portion and a second predetermined portion, the first and second predetermined portions being visually imperceptible to the user, and the first and second predetermined portions being disposed proximate to corresponding longitudinal edges of the display screen.

14. The information processing apparatus of claim 13, wherein the displayed content comprises at least a portion of two opposing pages of the electronic document, the opposing pages being separated by an inner margin, the first predetermined portion corresponding to an outer edge of a first one of the opposing pages, and the second predetermined portion corresponding to an outer edge of a second one of the opposing pages.

15. The information processing apparatus of claim 14, wherein the control unit is further configured to:
  determine that the activation position falls within the first predetermined portion of the display screen; and
  identify the first successive page of the electronic document, wherein the first successive page is disposed at a position in the electronic document after the first page.

16. The information processing apparatus of claim 14, wherein the control unit is further configured to:
  determine that the activation position falls within the second predetermined portion of the display screen; and
  identify the first successive page of the electronic document, based on at least the determination, wherein the first successive page is disposed at a position in the electronic document prior to the first page.

17. The information processing apparatus of claim 14, wherein the control unit is further configured to:
  determine that activation position falls within the first or second predetermined portions;
  identify a corresponding one of the opposing pages associated with the activation position, based on at least the determination;
  select the first successive page of the electronic document based on at least the activation type and the identified opposing page; and
  generate a signal to display a preview of the first successive page is a position proximate to a corresponding one of the first and second predetermined portions.

18. A method for processing information, comprising:
  displaying content on a display surface of a display unit, the content being associated with at least a portion of a page of an electronic document;
  detecting a type of user activation, the type of user activation being associated with an activation position on the display surface, wherein the user activation comprises (i) a first contact between a first human appendage and the display surface and (ii) a second contact between a second human appendage and the display surface;
  determining whether the activation position falls within a predetermined portion of the display screen, the predetermined portion being visually imperceptible to the user; and
  identifying a second page of the electronic document based on at least the type of user activation, when the activation position falls within the pre-determined portion.

19. A non-transitory, computer-readable storage medium storing a program that, when executed by a processor, causes the processor to perform a method for processing information, comprising:
  displaying content on a display surface of a display unit, the content being associated with at least a portion of a page of an electronic document;
  detecting a type of user activation, the type of user activation being associated with an activation position on the display surface, wherein the user activation comprises (i) a first contact between a first human appendage and the display surface and (ii) a second contact between a second human appendage and the display surface;

determining whether the activation position falls within a predetermined portion of the display screen, the predetermined portion being visually imperceptible to the user; and identifying a second page of the electronic document based on at least the type of user activation, when the activation position falls within the pre-determined portion.

20. An information processing apparatus, comprising:

a display unit configured to display a first portion of content to a user, the display unit comprising a display surface;

a receiving unit configured to receive a position on the display surface corresponding to a user activation, wherein the user activation comprises (i) a first contact between a first human appendage and the display surface and (ii) a second contact between a second human appendage and the display surface; and a control unit configured to:
    determine whether the received position falls within a pre-determined portion of the display surface; and
    generate a signal to display a second portion of content to the user, when the received position falls within a pre-determined portion, wherein the display unit is further configured to display the second content portion, based on the generated signal.

\* \* \* \* \*